United States Patent
Noto et al.

(10) Patent No.: US 12,308,700 B2
(45) Date of Patent: May 20, 2025

(54) ROTATING ELECTRICAL MACHINE AND STATOR FOR ROTATING ELECTRICAL MACHINE

(71) Applicants: Hitachi Astemo, Ltd., Hitachinaka (JP); Honda Motor Co., Ltd., Tokyo (JP)

(72) Inventors: Hideaki Noto, Hitachinaka (JP); Hiroshi Aoki, Hitachinaka (JP); Shunsuke Isogai, Hitachinaka (JP); Keiichiro Kashiwabara, Tokyo (JP); Norifumi Yasuda, Tokyo (JP); Tsutomu Yoshinari, Tokyo (JP)

(73) Assignees: HITACHI ASTEMO, LTD., Hitachinaka (JP); HONDA MOTOR CO., LTD, Tokyo (JP)

( * ) Notice: Subject to any disclaimer, the term of this patent is extended or adjusted under 35 U.S.C. 154(b) by 145 days.

(21) Appl. No.: 17/861,889

(22) Filed: Jul. 11, 2022

(65) Prior Publication Data
US 2023/0009899 A1    Jan. 12, 2023

(30) Foreign Application Priority Data
Jul. 12, 2021 (JP) .................................. 2021-115090

(51) Int. Cl.
*H02K 3/34* (2006.01)
*H02K 1/16* (2006.01)
*H02K 1/22* (2006.01)

(52) U.S. Cl.
CPC .................. *H02K 1/16* (2013.01); *H02K 1/22* (2013.01)

(58) Field of Classification Search
CPC ............ H02K 1/16; H02K 1/22; H02K 15/12; H02K 1/165; H02K 1/18; H02K 1/185; H02K 3/34; H02K 3/345; H02K 15/10; H02K 15/105

USPC ..................................................... 310/208, 43
See application file for complete search history.

(56) References Cited

U.S. PATENT DOCUMENTS

| | | | |
|---|---|---|---|
| 2012/0062065 A1* | 3/2012 | Tanaka | H02K 1/04 310/216.004 |
| 2014/0210304 A1 | 7/2014 | Tamura | |
| 2015/0108857 A1* | 4/2015 | Takahashi | H02K 9/19 310/208 |
| 2016/0043605 A1* | 2/2016 | Mizutani | H02K 3/12 310/45 |

(Continued)

FOREIGN PATENT DOCUMENTS

| | | |
|---|---|---|
| JP | H03-124247 A | 5/1991 |
| JP | 2014-143885 A | 8/2014 |

(Continued)

OTHER PUBLICATIONS

Machine translation of Japanese Office Action issued in corresponding JP Patent Application No. 2021-115090, dated Feb. 25, 2025 (6 pages).

*Primary Examiner* — Michael Andrews
(74) *Attorney, Agent, or Firm* — Foley & Lardner LLP

(57) ABSTRACT

A stator, of a rotating electrical machine, includes a core including a plurality of teeth and a slot formed between the teeth, and a plurality of coils inserted into the slot and fixed with varnish, in which the plurality of coils is disposed side by side in a radial direction in the slot, and the varnish is most applied to at least an innermost diameter side coil among the plurality of coils in the slot.

3 Claims, 5 Drawing Sheets

(56) References Cited

U.S. PATENT DOCUMENTS

2023/0170774 A1\* 6/2023 Blanc ...................... H02K 3/34
310/216.001

FOREIGN PATENT DOCUMENTS

| JP | 2016-171649 A | 9/2016 |
| JP | 2018-148600 A | 9/2018 |

\* cited by examiner

ROTATING ELECTRICAL MACHINE AND STATOR FOR ROTATING ELECTRICAL MACHINE

BACKGROUND OF THE INVENTION

1. Field of the Invention

The present invention relates to a rotating electrical machine and a stator of the rotating electrical machine.

2. Description of the Related Art

As a background art of the invention of the present application, in order to prevent thermal deterioration of a fixing resin in application of a high voltage and improve insulation reliability of a stator, JP 2018-148600 A discloses a technique in which in a stator, of a rotating electrical machine, including an electric wire including a conductor covered with an insulation layer and a first resin covering an outer face of the insulation layer, second resin is provided at least at a corner portion of the adjacent electric wires of an outer face of a segment coil which is a bundle of electric wires.

Citation List

Patent Literature

PTL 1: JP 2018-148600 A

SUMMARY OF THE INVENTION

In a conventional configuration, a slot liner (insulation paper) and a coil are inserted into a tooth portion of a stator of a rotating electrical machine, and then a resin (varnish) is injected into a gap therebetween to enhance a fixing force of the coil and suppression of a core opening. However, filling a gap with the varnish increases a transmission rate between the coil and the stator, and also increases a transmission vibration amount, so that there is a problem that a vibration noise (NVH) property deteriorates.

In view of this, an object of the present invention is to provide a stator of a rotating electrical machine that achieves both suppression of vibration noise and improvement of reliability.

A stator, of a rotating electrical machine of the present invention, includes a core including a plurality of teeth and a slot formed between the teeth, and a plurality of coils inserted into the slot and fixed with varnish, wherein the plurality of coils is disposed side by side in a radial direction in the slot, and the varnish is most applied to at least an innermost diameter side coil among the plurality of coils in the slot.

It is possible to provide a stator of a rotating electrical machine that achieves both suppression of vibration noise and improvement of reliability.

DESCRIPTION OF THE PREFERRED EMBODIMENTS

Figure 1A:
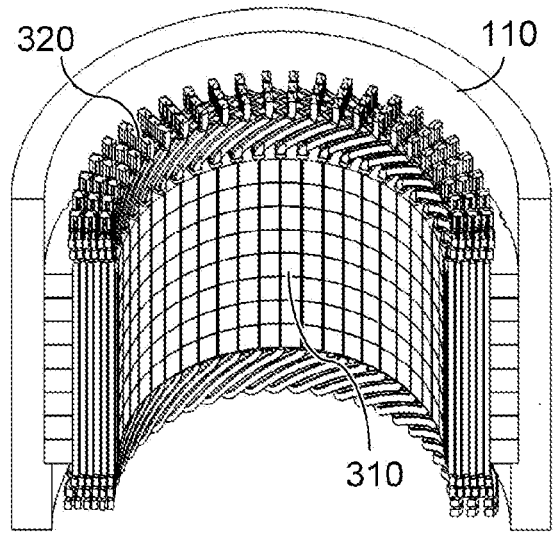
FIGS. 1A and 1B are cross-sectional views of a stator of a rotating electrical machine and a view for explaining teeth and slots of the stator.

Hereinafter, the embodiment of the present invention will be described with reference to the drawings. The following description and drawings are examples for describing the present invention, and are omitted and simplified as appropriate for the sake of clarity of description. The present invention can be carried out in various other forms. Unless otherwise specified, each component may be singular or plural.

Positions, sizes, shapes, ranges, and the like of the components illustrated in the drawings may not represent actual positions, sizes, shapes, ranges, and the like in order to facilitate understanding of the invention. Therefore, the present invention is not necessarily limited to the position, size, shape, range, and the like disclosed in the drawings.

(Overall Configuration of an Embodiment of Present Invention and Stator of Rotating Electrical Machine Including the Same)

Figure 1B:
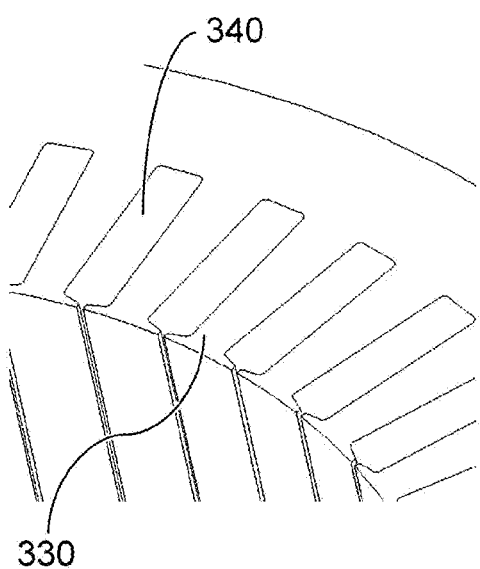

FIGS. 1A and 1B cross-sectional views of a stator of a rotating electrical machine and a view for explaining teeth and slots of the stator.

The stator of a rotating electrical machine 100 includes a stator core 310 and a coil 320 inserted into the stator core 310. In the stator, a three-phase alternating current is input to a motor (not illustrated) via a terminal of the coil 320 to generate a rotation magnetic field, so that an electromagnetic force due to the magnetic field generates a rotational force (torque).

In the stator core 310, the coils 320 each of which is a soft magnetic iron core having high magnetic permeability with respect to air are stacked. The coil 320 generates the above-described rotation magnetic field to form a magnetic path in the stator core 310. The coil 320 is fixed in a slot 340 of the stator core 310 by shrink fitting of a housing 110 from the outside of the stator and curing of a varnish (resin) 1 to be described later. Insulation paper (described later with reference to FIG. 2) for insulation is disposed between the coil 320 and the stator core 310. Note that the coil 320 is made of, for example, a copper material or an aluminum material, and is made of a material having a high conductivity and a small loss.

The plurality of slots 340 is provided between the plurality of teeth 330 disposed at equal intervals, is disposed at equal intervals in the stator core 310, and protrudes toward the inner peripheral side.

Figure 2:
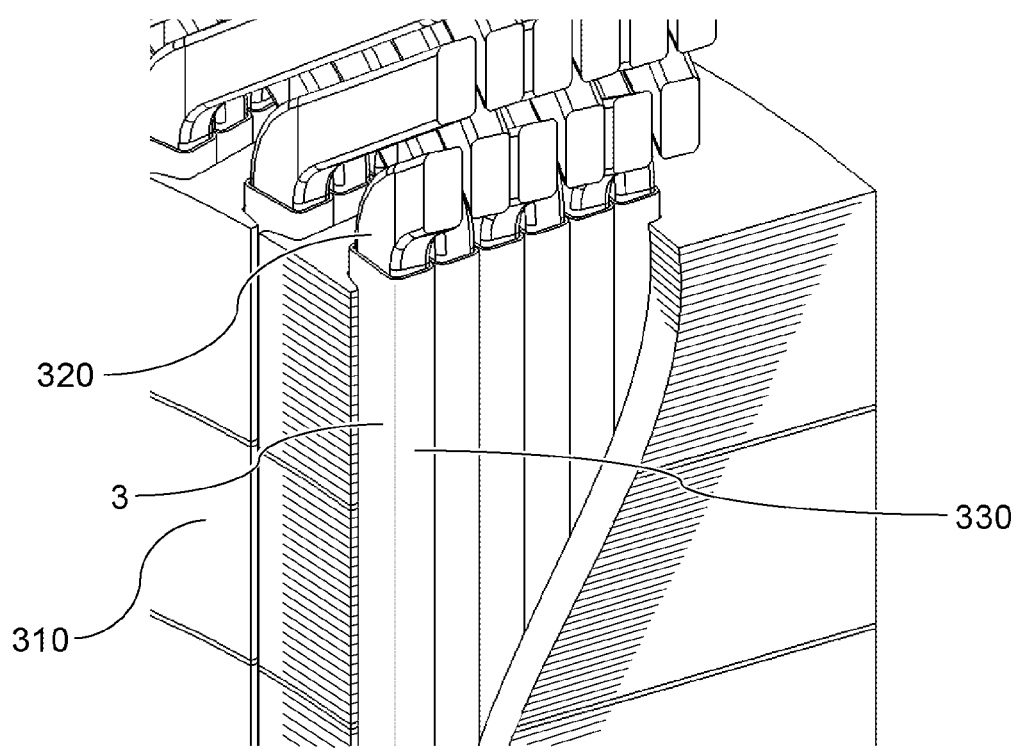
FIG. 2 is a diagram illustrating a coil and an insulation paper in a slot.

FIG. 2 is a diagram illustrating a coil and insulation paper in a slot.

Each of the coils 320 disposed in the slot 340 of the stator core 310 is insulated and protected by the insulation paper 3. In the slot 340, the coils 320 are disposed side by side in the radial direction.

Figure 3:
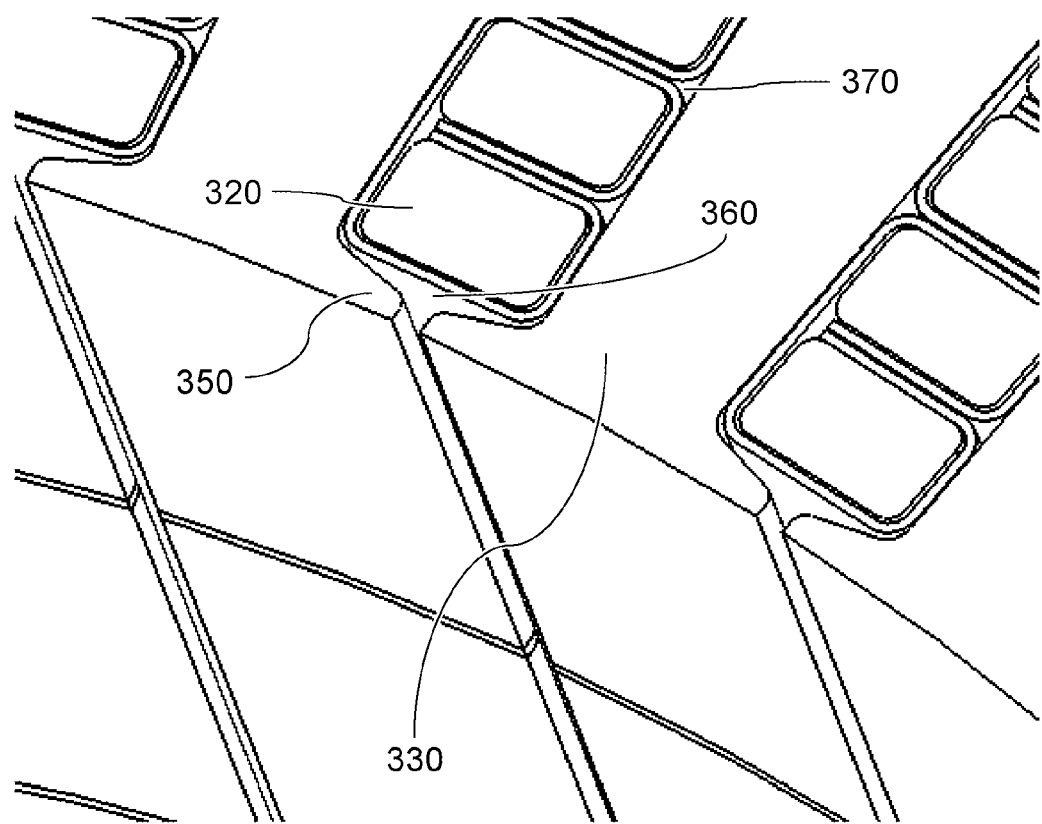
FIG. 3 is an enlarged view of an innermost diameter side of the stator of the rotating electrical machine.

FIG. 3 is an enlarged view of the innermost diameter side of the stator of the rotating electrical machine.

A protrusion 350 is provided at the tip of the tooth 330 on the innermost diameter side of the stator core, and the adjacent teeth 330 have the respective protrusions 350 protruding toward each other. The protrusion 350 prevents the coil 320 from falling off to the inner periphery of the stator core 310.

The predetermined space 360 is a space provided between the protrusion 350 and the innermost peripheral side coil 320 in the slot. Thus, a varnish 1 described later easily penetrates in the axial direction along the coil 320 in the slot.

Figure 4A:
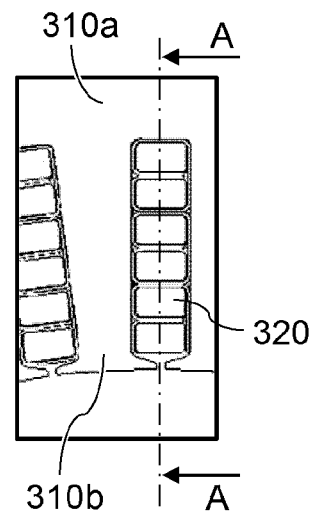
FIGS. 4A and 4B are views showing a varnish application range according to an embodiment of the present invention.
Figure 4B:
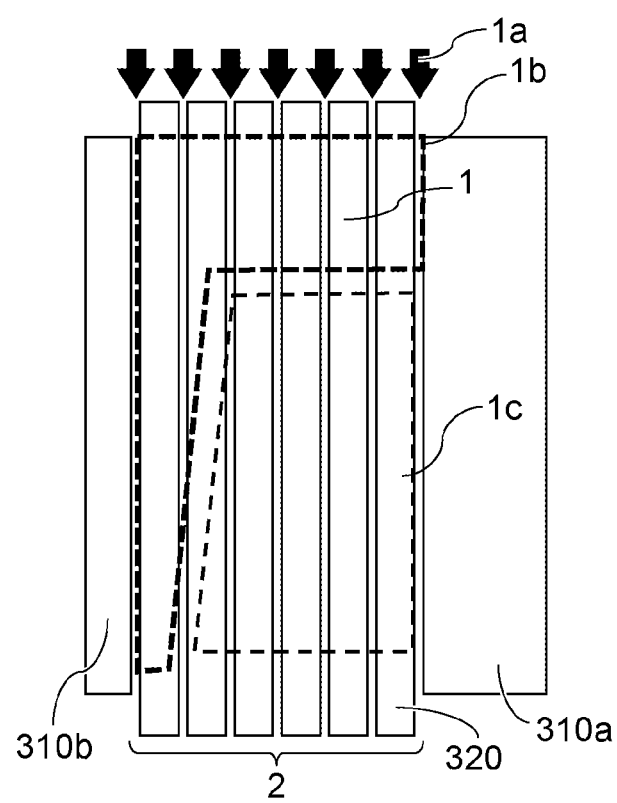

A gap 370 is a gap formed between the plurality of coils 320 and the tooth 330 in the slot 340. In the present invention, as shown in FIGS. 4A and 4B to be described later, the varnish 1 penetrates only part of the gap 370 from the axial end. In this way, transmission of vibration of the rotating electrical machine 100 caused by the coil 320 being completely fixed to the stator can be reduced, and comfort against noise, vibration, and harshness (NVH) can be improved.

FIGS. 4A and 4B are diagrams illustrating a varnish application range according to an embodiment of the present invention. FIG. 4B is a cross-sectional view taken along line A-A of FIG. 4A.

The varnish 1 is a coating material in which a resin or the like for the purpose of adhesion, insulation, or the like between components is included as a solvent. The varnish 1 is injected into the slot 340 from the injection direction 1a, and when a plurality of layers of the coil 320 is a layer 2 in the slot 340, the varnish 1 is most applied to the innermost diameter side (inner peripheral side 310b of the stator core) of the layer 2. The varnish 1 is applied to the innermost diameter side coil 320 of the layer 2 from the axial end of the slot to a predetermined position (application range 1b).

The reason why the varnish 1 is applied in the application range 1b is to improve the comfort against NVH described above and to prevent a force that opens the innermost peripheral portion of the stator core 310 formed by overlapping a plurality of layers in the vertical direction from acting due to shrink fitting fixing by the housing 110 (see FIGS. 1A and 1B).

The opening of the innermost peripheral portion of the core 310 of the stator may occur at any position in the axial direction, and when there is even one, of the positions, where the varnish 1 is not disposed, the probability that the opening of the core 310 occurs increases. Therefore, on the inner peripheral side of the coil 320, it is necessary to continuously apply (1b) the varnish 1 to a predetermined position without a gap to increase the impregnation rate. In this way, it is possible to simultaneously achieve the function of fixing the coil 320 and the function of suppressing the opening of the core 310. In addition, the range (1c) in which the varnish 1 is not applied has a role of improving the comfort against NVH of the rotating electrical machine 100 because it is difficult to transmit the vibration of the rotating electrical machine 100 by not applying the varnish 1.

For the injection direction 1a of the varnish 1, the varnish 1 may be injected from the connection side of the terminal of the coil 320 inserted into the stator, or may be injected from the opposite to the connection side.

Figure 5:
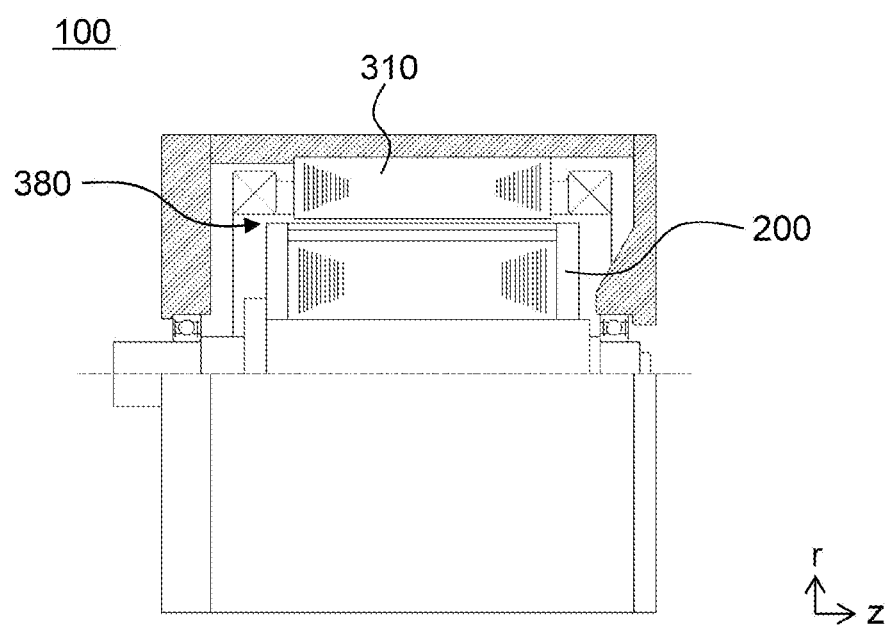
FIG. 5 is an overall view of a rotating electrical machine.

FIG. 5 is an overall view of the rotating electrical machine.

In the rotating electrical machine 100, a predetermined gap 380 is provided between the fixed core 310 (stator) adopting the configuration of the present invention and a rotor 200.

According to an embodiment of the present invention described above, the following operational effects are obtained.

(1) In a stator of the rotating electrical machine 100, the stator includes the core 310 including the plurality of teeth 330 and the slot 340 formed between the teeth 330, and the plurality of coils 320 inserted into the slot 340 and fixed with the varnish 1, wherein the plurality of coils 320 is disposed side by side in a radial direction in the slot 340, and the varnish 1 is most applied to at least an innermost diameter side coil 320 among the plurality of coils 320 in the slot 340. With this configuration, it is possible to provide a stator of a rotating electrical machine that achieves both suppression of vibration noise and improvement of reliability.

(2) The varnish 1 is applied to the innermost diameter side coil 320 from an axial end of the slot 340 to a predetermined position in the slot 340. With this configuration, it is possible to prevent the stator from being opened by shrink fitting of the housing 110.

(3) The plurality of teeth 330 has respective protrusions 350, adjacent teeth 330 having the respective protrusions 350 protruding toward each other on an innermost diameter side of the stator, and a predetermined space 360 is formed between the protrusions 350 and the innermost diameter side coil 320. With this configuration, the varnish 1 easily permeates in the axial direction along the coil 320 in the slot.

(4) The rotating electrical machine 100 includes a stator and the rotor 200 disposed facing the stator with a predetermined gap 380 interposed therebetween. With this configuration, it is possible to provide the rotating electrical machine 100 adopting the configuration of the present invention.

Note that the present invention is not limited to the above embodiment, and various modifications and other configurations can be combined without departing from the gist of the present invention. Further, the present invention is not limited to the embodiment including all the configurations described in the above-described embodiment, and may include the embodiment in which part of the configuration is deleted.

REFERENCE SIGNS LIST 1 varnish (resin)
1a injection direction of vanish
1b application range of vanish
1c range in which vanish is not applied
2 layer
3 insulation paper
100 rotating electrical machine
110 housing
200 rotor
310 stator core
310a outer peripheral side of stator core
310b inner peripheral side of stator core
320 coil
330 teeth
340 slot
350 protrusion
360 predetermined space
370 gap
380 predetermined gap between rotor and stator

What is claimed is:

1. A stator of a rotating electrical machine, the stator comprising:
  a core including a plurality of teeth and a slot formed between the teeth; and
  a plurality of coils inserted into the slot and fixed with varnish, wherein
    the plurality of coils is disposed side by side in a radial direction in the slot,
    a greater amount of the varnish is applied to at least an innermost diameter side coil among the plurality of coils in the slot than to at least another coil among the plurality of coils, and the varnish is continuously applied in a first range from the innermost diameter side coil from an axial end of the slot to a first predetermined position in the slot and a second range from another coil from the axial end of the slot to a second predetermined position closer to the axial end of the slot than the first predetermined position in the slot, and the core has a third range where the varnish is not applied from the second predetermined position to another axial end of the slot.

2. The stator of the rotating electrical machine according to claim 1, wherein the plurality of teeth has respective protrusions, the adjacent teeth having the respective protrusions protruding toward each other on an innermost diameter side of the stator, and a predetermined space is formed between the protrusions and the innermost diameter side coil.

3. A rotating electrical machine comprising:

the stator of the rotating electrical machine according to claim 1, and a rotor disposed facing the stator with a predetermined gap interposed therebetween.

* * * * *